US007313637B2

(12) United States Patent
Tanaka et al.

(10) Patent No.: US 7,313,637 B2
(45) Date of Patent: Dec. 25, 2007

(54) FABRIC AND METHOD FOR SHARING AN I/O DEVICE AMONG VIRTUAL MACHINES FORMED IN A COMPUTER SYSTEM

(75) Inventors: Tsuyoshi Tanaka, Kokubunji (JP); Keitaro Uehara, Kokubunji (JP); Yuji Tsushima, Hachioji (JP); Naoki Hamanaka, Tokyo (JP); Daisuke Yoshida, Hadano (JP); Yoshinori Wakai, Hadano (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 10/727,602

(22) Filed: Dec. 5, 2003

(65) Prior Publication Data

US 2004/0187106 A1    Sep. 23, 2004

(30) Foreign Application Priority Data

Feb. 18, 2003    (JP)    ............................. 2003-040232

(51) Int. Cl.
*G06F 3/00*    (2006.01)

(52) U.S. Cl. .............................. 710/8; 710/15; 710/18; 710/19

(58) Field of Classification Search .................... 710/8, 710/15, 18–19, 74, 100, 313; 714/5–8
See application file for complete search history.

(56) References Cited

U.S. PATENT DOCUMENTS 5,870,537 A * 2/1999 Kern et al. .................... 714/6
6,081,865 A * 6/2000 Tavallaei et al. ............ 710/309
6,304,980 B1 * 10/2001 Beardsley et al. ............ 714/6
6,622,263 B1 * 9/2003 Stiffler et al. ................ 714/13
6,792,557 B1 * 9/2004 Takamoto et al. ............ 714/7
6,874,046 B1 * 3/2005 LeCrone et al. ............ 710/74
7,003,688 B1 * 2/2006 Pittelkow et al. ............ 714/7

FOREIGN PATENT DOCUMENTS

JP    9-288590    4/1996
JP    11-85547    9/1997

OTHER PUBLICATIONS

"Computer Input/Output", Jan. 31, 1996, http://ncca.bournemouth.ac.uk/CourseInfo/BAVisAn/Year1/CompSys/IO/.*
Jim Gray and Andreas Reuter, "Transaction Processing: Concepts and Techniques", Empirical Studies, published by Morgan Kaufmann Publishers, pp. ix, 101-103.
"Advanced Configuration and Power Interface Specification", Oct. 11, 2002, Compaq/Intel/Microsoft/Phoenix/Toshiba, pp. xii, 167-172.

* cited by examiner

*Primary Examiner*—Alford Kindred
*Assistant Examiner*—Chun-Kuan (Mike) Lee
(74) *Attorney, Agent, or Firm*—Reed Smith LLP; Stanley P. Fisher, Esq.; Juan Carlos A. Marquez, Esq.

(57) ABSTRACT

Disclosed herein is a computer system provided with a mechanism for connecting a single port disk to an active server and the disk to a standby server when in a fail-over processing. An "add_pci" command issued from a clustering program is used to let a control program change the allocation of a PCI slot while an interruption signal issued to a standby server permits an ACPI processing routine to hot-add a PCI card that includes the disk unit on the subject guest OS.

8 Claims, 17 Drawing Sheets

FIG.3

| | COMMAND NAME | VIRTUAL MACHINE NUMBER |
|---|---|---|
| (a) | deact | LPAR=0 |
| (b) | act | LPAR=0 |
| (c) | add_pci | LPAR=0 |
| (d) | rem_pci | LPAR=0 |

FIG.4

| PCI slot # | CONNECTED TO | ENABLE FLAG |
|---|---|---|
| 0 | LPAR0 | 1 |
| 1 | LPAR0 | 1 |

400

| PCI slot # | CONNECTED TO | ENABLE FLAG |
|---|---|---|
| 0 | LPAR0 | 0 |
| 1 | LPAR0 | 0 |

401

| PCI slot # | CONNECTED TO | ENABLE FLAG |
|---|---|---|
| 0 | LPAR1 | 1 |
| 1 | LPAR1 | 1 |

| PCI bus # | BASE | SIZE | OFFSET |
|---|---|---|---|
| 0 | 0 | 24GB | +0 |

FIG.8B

| PCI bus # | BASE | SIZE | OFFSET |
|---|---|---|---|
| 0 | 0 | 32GB | +32GB |

(a)

(b)

HOT-REMOVE PROCESSINGS

FABRIC AND METHOD FOR SHARING AN I/O DEVICE AMONG VIRTUAL MACHINES FORMED IN A COMPUTER SYSTEM

BACKGROUND OF THE INVENTION

1. Field of the Invention

The present invention relates to a computer system in which an operating system (OS) that enables hot-plugging of a PCI device runs, more particularly to a computer system that uses a control program for enabling hot-plugging of a PCI device to be inserted/ejected in/from an object logically.

2. Description of Related Art

How to cope with errors efficiently in computer systems is now an important issue for realizing such nonstop long time operations as 24-hour 365-day services. As described in "TRANSACTION PROCESSING: CONCEPTS AND TECHNIQUES" written by JIM GRAY, the rate of software errors is increasing year by year recently. This is why appearance of countermeasures that can cope with those software errors is expected strongly now.

Memory leaks and application software bugs have been considered as causes of the above-described software errors. Those memory leaks and application software bugs are often resulted from a memory area that is kept occupied after it is used for processings of an operating system (OS) and/or application software programs. So far, there has been proposed some methods to eliminate such software errors. One of the methods restarts services and the subject OS operation periodically with use of a computer system management software program. However, the method must stop those services during such a restarting operation. This has been a problem.

To solve such a problem, there has also been proposed another method that form a cluster with a plurality of servers physically with use of a clustering program and perform fail-over processings for such services as those of Web servers and DBMs (Database Management Systems).

The method forms a cluster with an active server that provides services and a standby server that provides no service. And, the method enables message communications referred to as heart beats to be made between those servers and time stamps to be written periodically in a shared disk so as to check each of the active and standby servers for error occurrence. If the heart beat stops or the time stamp in the shared disk is not updated properly, it is decided as error occurrence, so that the service executed in the error-detected active server is succeeded by and restarted in the normal standby server (fail-over processing).

The method for forming a cluster with such physical servers requires (1) preparing a plurality of computers physically, (2) providing the system additionally with a router device and a network interface card used for the heart beats so as to form a network dedicated to the heart beats, and (3) preparing a common data disk used to execute the same services in the plurality of servers.

If only software errors are to be targeted, it is possible to solve the above problems with use of virtual machines. In the case of the above problem (1), the official gazette of JP-A No.288590/9 discloses a well-known method that forms a cluster only with virtual machines. In that connection, a plurality of virtual machines are operated in one physical computer to multiplex an operating system/application software program, thereby coping with the above-described software errors.

The official gazette of JP-A No.85547/11 also discloses another well-known method employed for the above problem (2). The method realizes communications between processes with communications between virtual machines, which uses a main memory. The method enables a cluster of virtual machines to be formed without using any of such hardware as a router and a network card for communications among the virtual machines.

To cope with the above problem (3), still another well-known method is used. The method enables a data disk to be shared among clustered computers with use of a disk unit (multi-port disk, multi-port RAID, or the like) provided with a plurality of such interfaces as SCSI ones for the connection between each server and the disk.

[Patent Document 1]
  Official gazette of JP-A No.288590/9

[Patent Document 2]
  Official gazette of JP-A No.85547/11

[Non-patent Document 1]
  "TRANSACTION PROCESSING: CONCEPTS AND TECHNIQUES" written by Jim Gray and Andreas Loiter, published by MORGAN KAUFMANN PUBLISHERS, PP.10-103

If a multi-port disk unit is shared among a plurality of virtual machines as described in the above conventional examples, however, the system manufacturing cost increases, since the multi-port disk drive (or I/O device) is expensive. This has been another problem.

Furthermore, in the above conventional examples, both active and standby virtual machines can access the shared multi-port disk unit freely, so that the standby virtual machine can access the disk unit even when a software error occurs therein. Consequently, the access to the disk unit from the active virtual machine comes to be affected adversely due to the unnecessary access from the error-occurred standby virtual machine. This has been still another problem.

Under such circumstances, it is an object of the present invention to provide a computer system that enables fail-over processings so as to improve the reliability and reduce the manufacturing cost of the system at the same time while the system employs a low-price single port I/O device.

SUMMARY OF THE INVENTION

In order to achieve the above object, the computer system of the present invention is provided with a plurality of virtual machines formed in a control program of a computer and an I/O device connected to a PCI bus of the computer and shared among the plurality of virtual machines. The computer system is also provided with a single port disposed in the I/O device and connected to the PCI bus, PCI connection allocating means for setting a state of logical connection between selected one of the plurality of virtual machines and the port, and I/O device switching means for updating the state of logical connection set by the PCI connection allocating means. The selected virtual machine changes the state of logical connection to the I/O device according to the setting by the PCI connection allocating means.

Particularly, the I/O device switching means includes interrupting means for updating the setting by the PCI connection allocating means and generating an interruption to notify the selected virtual machine of a change of the state of logical connection of the I/O device. The virtual machine, when receiving the interruption, changes its state of logical connection to the I/O device according to the setting by the PCI connection allocating means.

And, because the system, when receiving a predetermined control signal from a virtual machine, changes the state of logical (virtual) connection of the PCI-connected I/O device to the virtual machine and the virtual machine receives the interruption for enabling the connection change such way, the virtual machine that receives the interruption can hot-plug the single port I/O device. More particularly, if this I/O device is shared among a plurality of virtual machines consisting of an active machine and a plurality of standby machines and an error occurs in the active machine, the I/O device single port is switched to a standby machine and the standby machine can be started up as the new active one according to the interruption signal. This is why the present invention can assure the reliability of the system while suppressing the manufacturing cost with use of such a low-price single port I/O device.

BRIEF DESCRIPTION OF THE DRAWINGS

FIG. 3 is formats of commands executed by a control program of virtual machines or physical partitioned computers;

FIG. 4 is a PCI slot allocation table for managing the allocation and the valid/invalid state of each PCI slot;

FIG. 8 is a table for denoting a PCI bus of a gate keeper and identifying a physical address to be accessed from the PCI bus;

DETAILED DESCRIPTION OF THE PREFERRED EMBODIMENTS

Hereunder, the preferred embodiments of the present invention will be described with reference to the accompanying drawings.

Figure 1:
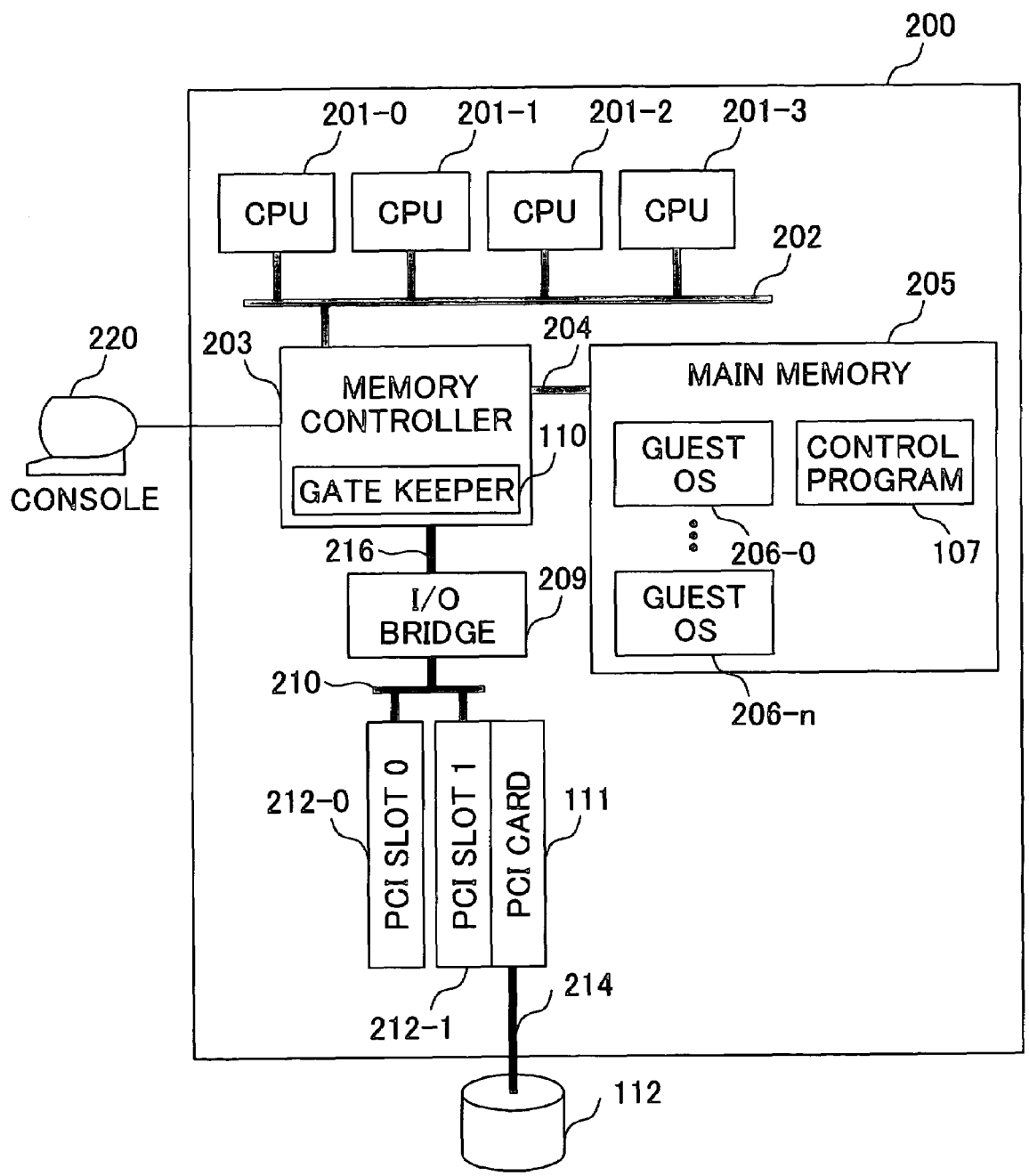
FIG. 1 is a block diagram of a virtual machine system in the first embodiment of the present invention.

FIG. 1 shows a block diagram of a computer system in the first preferred embodiment of the present invention.

The computer system 200 in this embodiment is configured by CPUs 201-0 to 201-3, a CPU bus 202, a memory controller 203, a memory bus 204, a main memory 205, an I/O bus 216, an I/O bridge 209, a PCI bus 210, PCI slots 212-0 and 210-1, a PCI card (PCI device) 111, and a disk unit 112 connected to the PCI card 111. In the computer system of the present invention, however, the quantity is not limited in any of the CPUs, the I/O bridge, the PCI bus, the PCI slot, and the disk unit shown in FIG. 1 respectively. The PCI card 111 is connected to the PCI slot 212-1 and provided with a single port.

Each of the PCI bus 210 and the PCI card 111 conforms to the ACPI (Advanced Configuration and Power Interface Specification) 2.0 and corresponds to the hot-plugging function. For details of the ACPI2.0, refer to http://www.acpi-.info/DOWNLOADS/ACPIspec-2-0b.pdf.

A control program 107 used to form a plurality of virtual machines (hereinafter, to be described as LPARs) and guest operating systems (OS) 206-0 to 206n that run in the LPARs are stored in the main memory. The system manager, when forming a LPAR, allocates a PCI slot to the LPAR. A PCI slot allocation table describes how each LPAR is allocated to a PCI slot and the table is retained in the control program 107. The guest operating systems (OSs) 206-0 to 206n correspond to the hot-plugging (hereinafter, to be described as the hot-add) function.

A gate keeper 110 is placed in the memory controller 203. The gate keeper 110 translates addresses of requests (in-bound accesses) issued from the PCI device (I/O device) connected to the PCI bus 210 to the main memory 205 so as to read/write data therefrom/therein.

Next, the concrete operation of the computer system of the present invention will be described with reference to FIG. 2.

Figure 2:
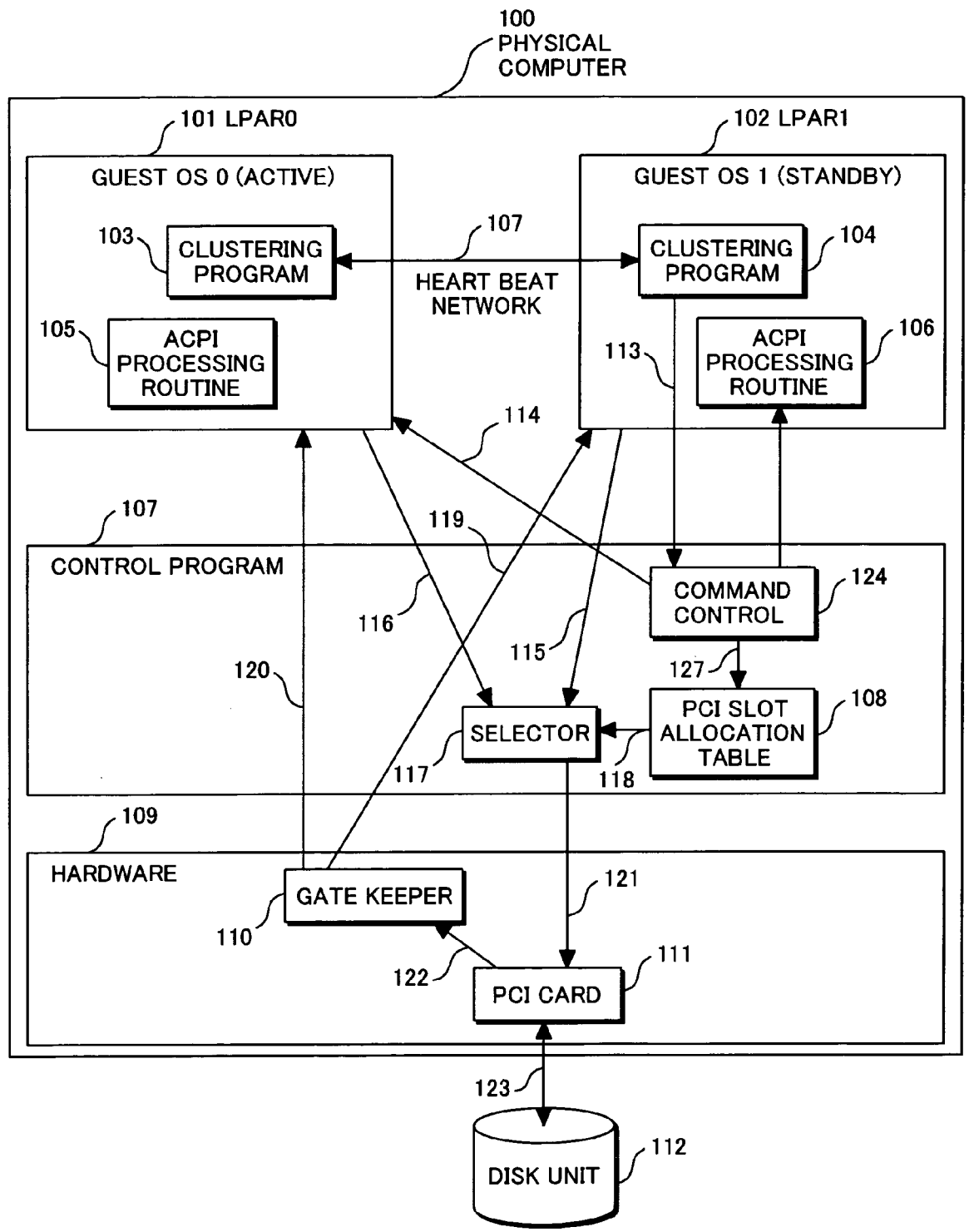
FIG. 2 is a block diagram of the virtual machine system for denoting interactions among the system components.

FIG. 2 shows a block diagram of a computer 100 for denoting the concept of the operation of the computer system shown in FIG. 1. The computer 100 includes a control program 107 that runs in the computer's hardware 109. The control program 107 forms virtual machines 101 (LPAR0) and 102 (LPAR1) and a guest OS runs in each of the virtual machines. A clustering program 103/104 runs in each guest OS to exchange signals (heart beats) between the virtual machines periodically through a heart beat network 107 so as to confirm the normal operation with each other.

The PCI slot allocation table 108 retained in the control program 107 describes correspondence between each PCI slot and each LPAR. FIG. 4 shows an example 400 of the PCI slot allocation table 108. In FIG. 4, the PCI slots 0 and 1 are allocated to the LPAR0. In the PCI slot allocation table 108, an enable flag is assigned to each PCI slot. If "1" is set in this enable flag, accesses to the PCI device (PCI card 111 in FIG. 2) connected to the subject PCI slot are permitted. If "0" is set in the enable flag, however, no access is permitted to the PCI device connected to the subject PCI slot. In other words, in the allocation table 400 shown in FIG. 4, accesses to the virtual machine LPAR0 are permitted. In the state 401 in the allocation table 400, however, accesses to the virtual machine LPAR0 are rejected. In the state 402 in the table 400, however, accesses only to the LPAR1 are permitted.

The control program 107 refers to the PCI slot allocation table 108 to decide whether to permit the access 118, then selects the access (outbound access) 115 or 116 to the disk unit 112 from a guest OS through a selector 117. A general protection exception is issued to each access from any LPAR that cannot be accessed. The exception is actually transmitted to the access request source OS (not shown).

For an inbound access such as a DMA access from the disk unit 112, the gate keeper 110 translates the address, thereby the disk unit 112 accesses a memory space allocated to each LPAR. Writing data in the gate keeper 110 is controlled by the control program 107.

Figure 7:
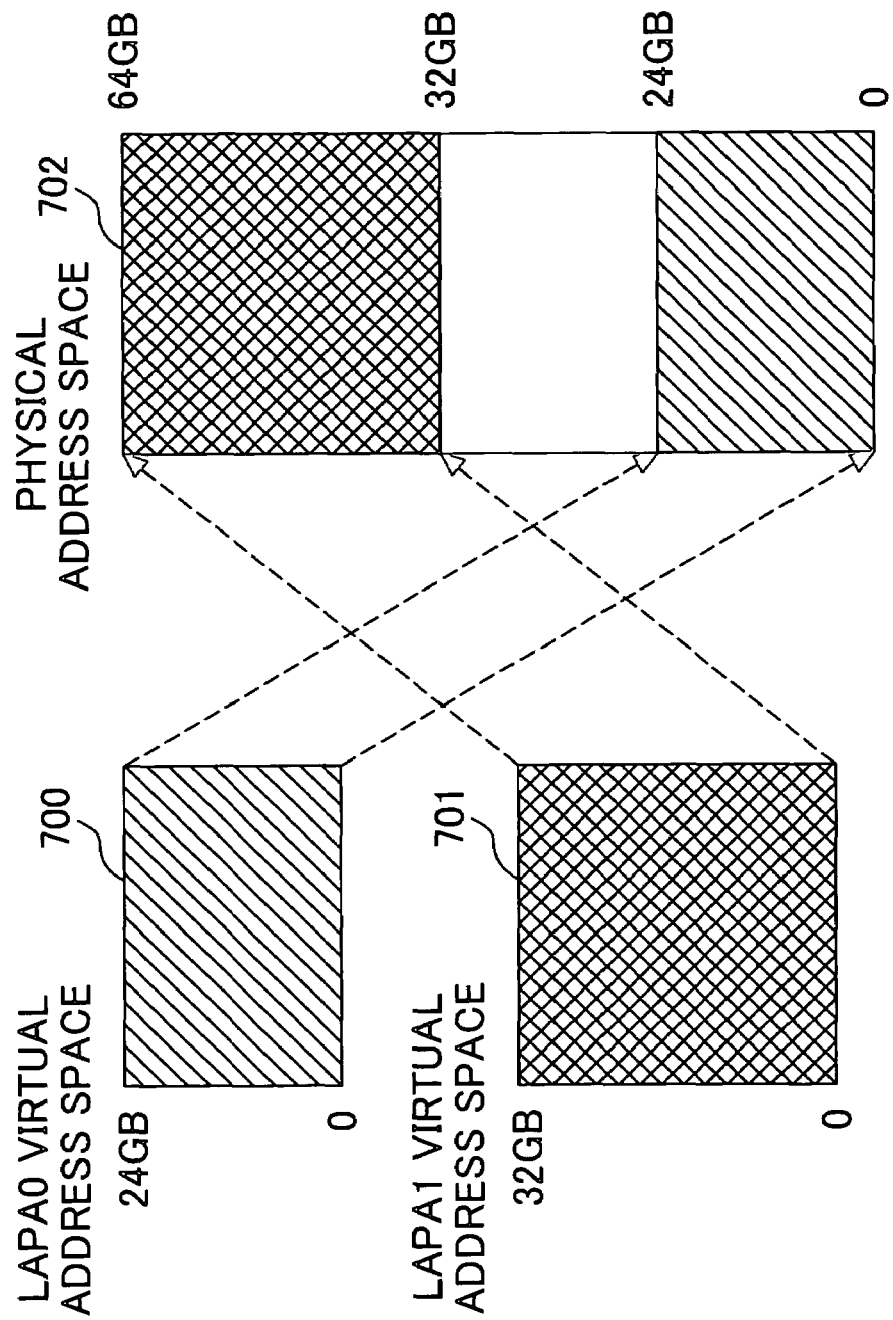
FIG. 7 is an illustration for denoting a relationship between a virtual address space and a physical memory address space allocated to each virtual machine in the virtual machine system.

In this case, it is premised that the virtual address spaces 700 and 701 of the LPAR0 and LPAR1 are mapped in the physical address space as shown in FIG. 7. In the disk unit 112 connected to the PCI bus 210, if it is allocated to the LPAR0, the data (a) shown in FIG. 8 is set in the gate keeper 110. Similarly, if the disk unit 112 is allocated to the LPAR1, the data (b) shown in FIG. 8 is set in the gate keeper 110.

User application programs such as a clustering program 103/104 in a guest OS can issue control commands (FIG. 3) to the control program 107 (113). The control program 107 analyzes and executes each of such commands with use of a command control routine 124. FIG. 3 shows an example of such control commands. Each control command is specified with a command name and a virtual machine number as shown in FIG. 3.

FIG. 3A shows the "deact" command for deactivating a specified virtual machine LPAR (LPAR0 in FIG. 3). This command is executed to deactivate the LPAR0, that is, turn off the LPAR0 power physically.

FIG. 3B shows the "act" command, which activates a specified virtual machine (LPAR0 in FIG. 3). This command is executed to activate the LPAR0, that is, turn on the LPAR0 power physically.

Figure 5:
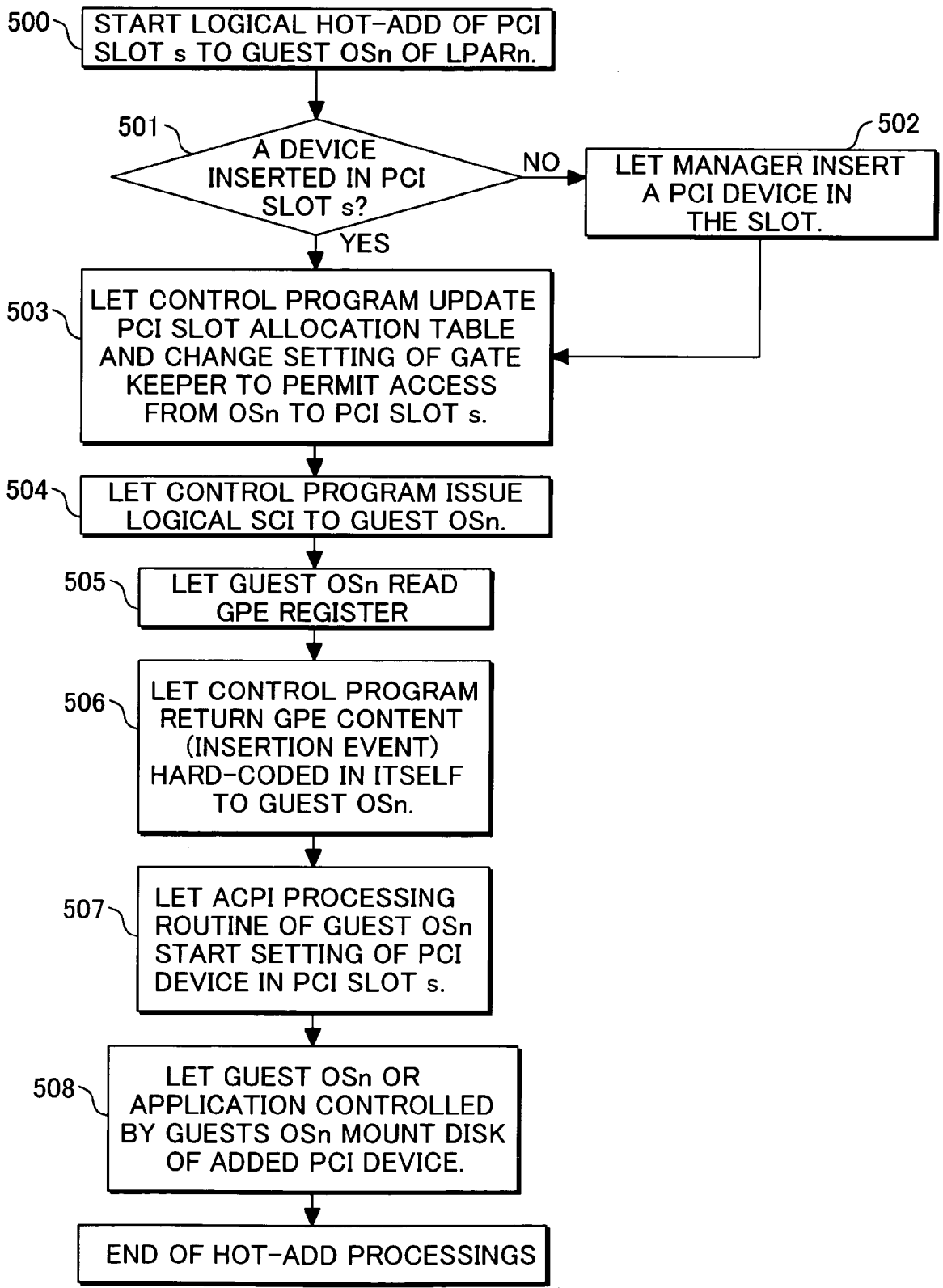
FIG. 5 is a flowchart of hot-add processings.

The "add_pci" command (FIG. 3C) connects the PCI slot (including the PCI device inserted in this PCI slot) allocated to a specified virtual machine LPAR (LPAR0 in this case) to the command issued LPAR logically. If this command issued LPAR is active, an Hot Add processing is executed as shown in FIG. 5. Next, a description will be made for the operation of the "add_pci" command.

FIG. 5 shows a flowchart of the processings for hot-adding a PCI slot s allocated to the LPARm in which a guest OSm runs to the LPARn in which a guest OSn runs. The control program 107 executes the hot-add processings. In FIG. 5, m, n, and s are integers that satisfy m≠n.

In step 500, the guest OSn issues an "add_pci" command to start a logical hot-add operation for the PCI slot s.

In step 501, the control program 107 checks the state of the PCI slot s. If no PCI device is inserted in the slot, control goes to step 502, in which the control program 107 instructs the command issued OS to insert a PCI device in the slot. On the other hand, if a PCI device is inserted in the slot s, control goes to step 503.

In step 502, no PCI device is inserted in the slot s. The system manager thus instructs so that a PCI device is inserted in the slot s. Then, if a PCI device is already inserted in the slot s, control goes to step 503.

If a PCI device is inserted in the slot s in step 503, the control program 107 permits the access from the OSn to the PCI slot s. Concretely, the control program 107 sets the PCI slot allocation table 108 so that the PCI slot s is connected to the LPARn, then sets "1" in the enable flag. For example, if the control program 107 changes the allocation of the PCI slot 0, which is now allocated to LPAR0, to LPAR1, the control program 107 updates the state 400 to 402 shown in FIG. 4.

Furthermore, the control program 107 rewrites the mapping information of the physical memory space provided in the virtual memory space registered in the gate keeper to the data corresponding to the LPARn (guest OSn). For example, the control program 107 updates the state shown in FIG. 8A to the state B with respect to the setting of the gate keeper allocated to the LPAR0 while the address space of both LPAR0 and LPAR1 are set as shown in FIG. 7.

In step 504, the control program 107 issues a logical SCI (System Call Interrupt) to the guest OSn. The SCI is defined by the ACPI.

In step 505, the guest OSn reads the content in the GPE (General-Purpose Event). The SCI and the GPE register are defined by the ACPI2.0 respectively.

In step 506, the control program 107 traps an GPE register access from the guest OSn and returns the content (insertion event) of the GPE register that is hard-coded in itself to the guest OSn.

In step 507, the control program 107 begins setting of the PCI device for the PCI slot s with use of the ACPI processing routine of the guest OSn.

In step 508, the guest OSn or application program in the guest OSn processes the added PCI device so that it is used. Concretely, the guest OSn or application program in the OSn mounts the disk unit connected to the PCI device, for example.

Consequently, the allocation of the PCI device is changed from OSm to OSn, thereby the OSn comes to be able to control this PCI device without being restarted.

Figure 6:
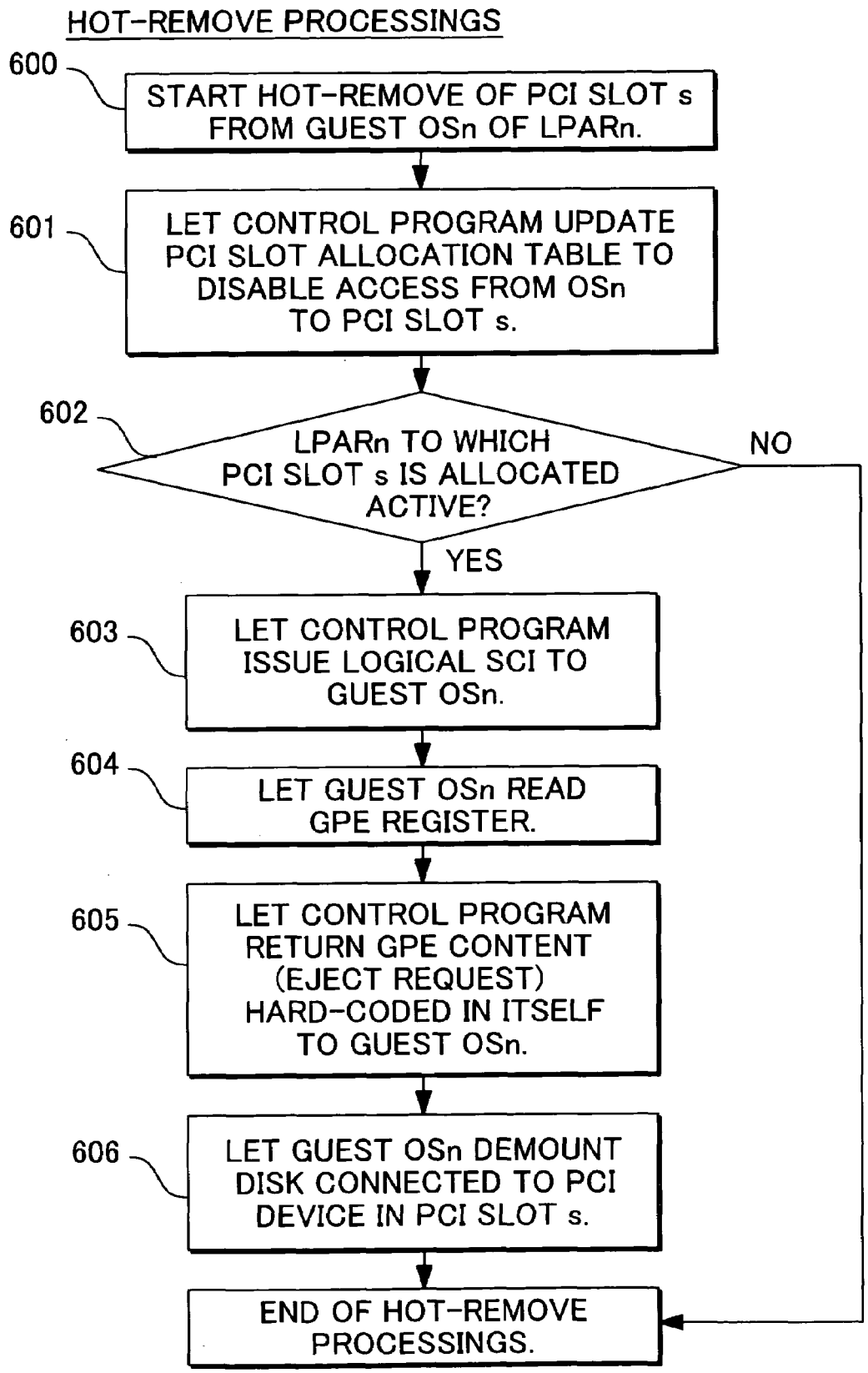
FIG. 6 is a flowchart of hot-remove processings.

After that, the "rem_pci" command shown in FIG. 3D is executed to logically hot-remove the PCI slot (including the PCI device inserted in the PCI slot) allocated to the specified virtual machine LPAR (see FIG. 6).

FIG. 6 shows a flowchart of the processings for hot-removing the PCI slot s allocated to the LPARn in which the guest OSn runs in response to a "rem_pci" command issued from the LPARm in which the guest OSm runs. The control program 107 executes the processings in the flowchart. The m, n, and s shown in FIG. 6 are integers that satisfy m≠n.

In step 600, the guest OSm issues a "rem_pci" command and the control program 107 begins a logical hot-remove operation for the PCI slot s of the LPARn in which the guest OSn runs.

In step 601, the control program 107 disables accesses of the LPARn to the PCI slot s. Concretely, the control program 107 sets "0" in the enable flag of the PCI slot s in the PCI slot allocation table 108 retained therein. Then, for example, the control program 107 updates the state 400 to the state 401 shown in FIG. 4 with respect to the PCI slot 0 allocated to the LPAR0.

In step 602, the control program 107 checks whether or not the LPARn connected to the PCI slot s is active. If it is active, control goes to step 603. If not, the control program 107 exits the processing with no operation.

In step 603, the control program 107 issues a logical SCI to the guest OSn if the LPARn is decided to be active in step 602.

In step 604, the guest OSn reads the content in the GPE register.

In step 605, the control program 107 traps the access from the guest OSn to the GPE register and returns the content in the GPE register (eject request) hard-coded in itself to the guest OSn.

In step 606, the guest OSn stops the use of the PCI slot s if the LPARn is decided to be active in step 602 or after executing the processing in step 605. Concretely, the guest OSn demounts the disk unit connected to the PCI device inserted in the PCI slot s.

Consequently, the allocation of the PCI device to the OSn is canceled, thereby the OSn comes to be able to demount the PCI device without being restarted.

Next, a description will be made for how the computer system of the present invention perform a fail-over processing for a service with reference to FIGS. 2 and 9.

Errors that might occur in virtual machines LPAR when in fail-over processing may be classified into errors of the guest OS itself and errors of the subject service only.

Figure 9:
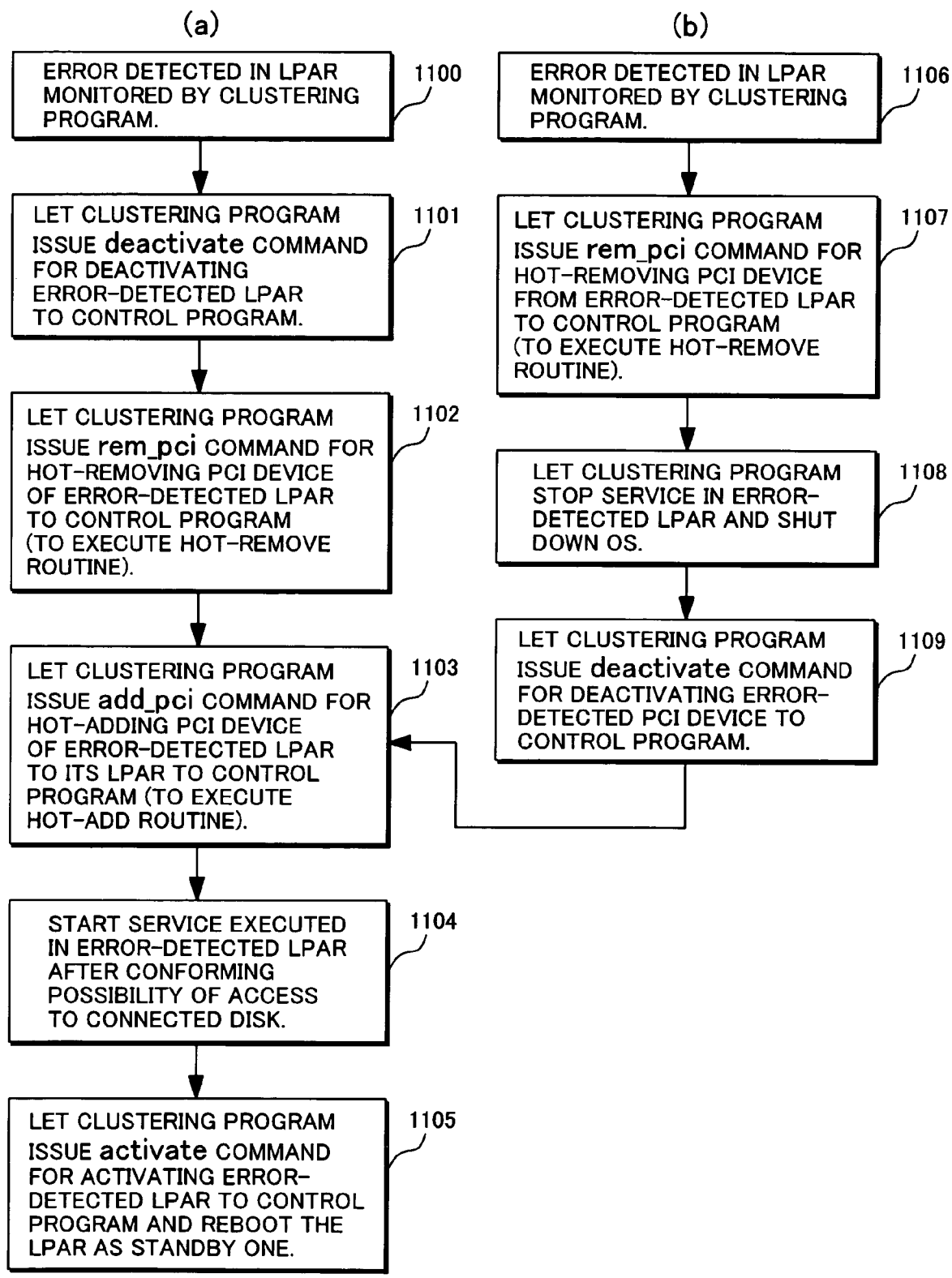
FIG. 9 is a flowchart of fail-over processings, (a) denoting a case in which an error-detected LPAR is deactivated without shutting down the OS and (b) denoting a case in which an error-detected LPAR is deactivated after shutting down the OS.

FIG. 9 shows the former error processing case, that is, a case (a) in which a LPAR is deactivated without shutting down the OS of the error-detected LPAR and the latter error processing case, that is, a case (b) in which the OS of the error-detected LPAR is shut down, then the subject LPAR is deactivated. At first, the case (a) will be described, then only the difference from the case (a) will be described for the case (b). Which is to be employed (a) or (b) is decided by the specification or setting of the clustering program.

In this embodiment, it is premised that the system is on the following operation conditions.

The LPAR0 for supplying services as shown in FIG. 2 is active while the LPAR1 stands by. Assume now that the disk unit 112 accesses a service operated in the active LPAR0. For example, assume now that the disk unit 112 stores a data base table. The disk unit 112 is connected to the PCI card (PCI device) 111 (123) connected to the PCI slot 0.

The PCI allocation table 108 retained in the control program 107 is in the state 400 shown in FIG. 4. The gate keeper 110 is in the state shown in FIG. 8.

<Case (a) in FIG. 9>

At first, the clustering program 104 of the LPAR1 detects an error in the LPAR0 in step 1100.

In step 1101, the clustering program 104 issues a "deact" command ((a) in FIG. 3 is issued (113)) for deactivating the error-detected LPAR0 to the control program 107. The control program 107 decodes the "deact" command with use of the command control routine 124, then deactivates the LPAR0 (114).

In step 1102, the clustering program 104 issues a "rem_pci" command ((d) shown in FIG. 3 is issued (113)) to the control program. The command hot-removes the PCI device from the error-detected LPAR0 and connects it to the LPAR1. The operation of the "rem_pci" command is similar to that in the hot-remove routine operation described above, excepting that the m and n values should be changed to m=0 and n=1.

In step 1103, the clustering program 104 issues an "add_pci" command ((c) shown in FIG. 3 is issued (113)) to the control program 107. The command hot-adds the PCI device removed from the error-detected LPAR0 to the LPAR1. The operation of the "add_pci" command is similar to that in the hot-add routine operation described above, excepting that the m and n values should be changed to m=1 and n=0.

In step 1104, the clustering program 104 confirms that the access to the disk 112 connected by the add_pci command is permitted, then starts up the target service having been executed in the error-detected LPAR0 in the LPAR1 under the control of the guest OS1.

In step 1105, the clustering program 104 issues an "act" command to the control program 107 to activate the error-detected LPAR0 (113), then starts up the LPAR0 as a standby machine. The control program 107 then decodes the "act" command with use of the command control routine 124 to activate the LPAR0 (114).

Figure 10:
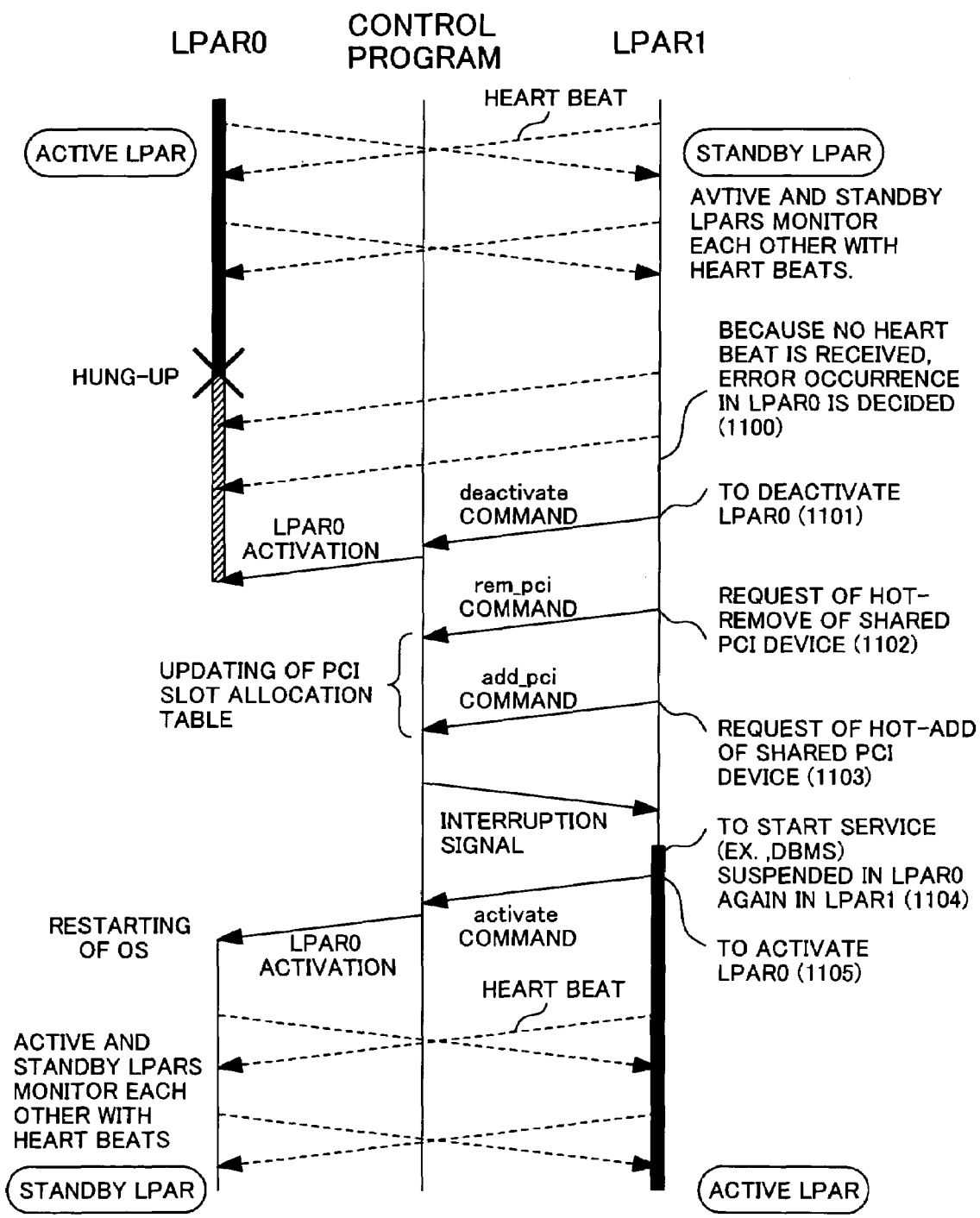
FIG. 10 is a time chart corresponding to the case (a) in FIG. 9.

Concretely, as shown in FIG. 10, after the error-detected LPAR0 is deactivated, the PCI device is hot-removed from the LPAR0, then hot-added to the LPAR1, thereby the PCI slot allocation table 108 is updated. After that, the LPAR1 becomes an active machine and succeeds the current service from the LPAR0, then receives requests from clients. The error-detected LPAR0 is then restarted as a standby one. The standby LPAR1 takes the place of the active LPAR0 such way and hereinafter the LPAR1 functions as an active LPAR.

As described above, because the logical connection of the PCI device provided with a single port is changed from the active one to a standby one so that the PCI device is hot-removed from the active LPAR, then hot-added to the standby LPAR, the PCI device can always be removed (end of connection) and added (start of connection) logically under the control of a single OS. Consequently, the system is not required to be restarted. The present invention can thus provide a highly reliable and low-price virtual machine system by using such a single port PCI device. And, the virtual machine system satisfies both improvement of the reliability and reduction of the manufacturing cost.

<Case (b) in FIG. 9>

The processing in step 1106 is the same as that in step 1100.

The processing in step 1107 is the same as that in step 1102.

In step 1108, the clustering program 104 instructs the guests OS0 of the LPAR0 to stop the active service and shut down the OS (107). The clustering program 103 thus stops the active service and shuts down the OS.

The processing in step 1109 is the same as that in step 1101.

The processings in and after step 1110 are already described above.

Figure 11:
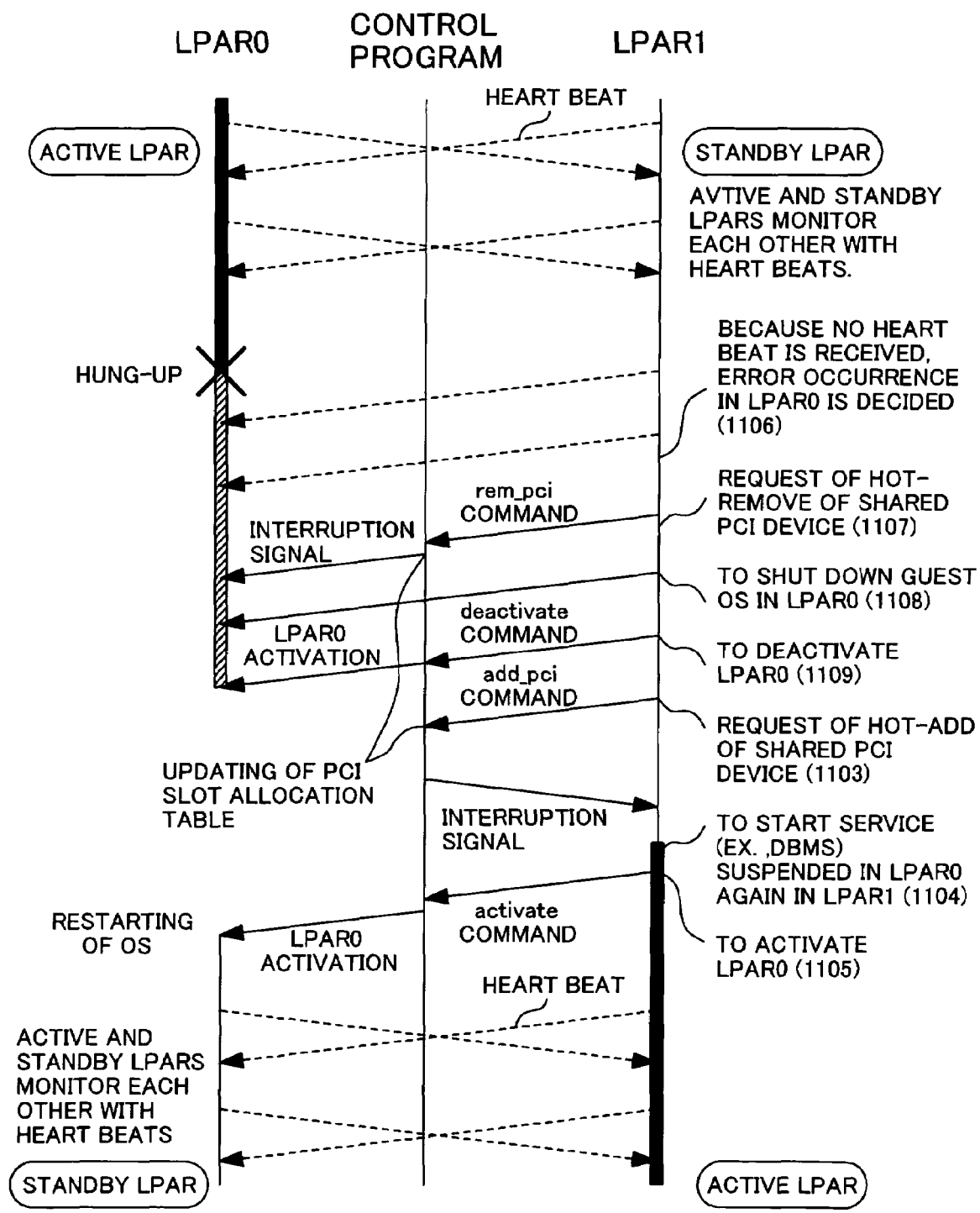
FIG. 11 is a time chart corresponding to the case (b) in FIG. 9.

As described with reference to FIG. 11, in this embodiment, the PCI device is hot-removed from the error-detected LPAR0 and the LPAR0 is deactivated. After that, similarly to the processings in and after step 1103, the PCI device is hot-added to the LPAR1, thereby the PCI slot allocation table 108 is updated. Furthermore, after the suspended service is restarted in the LPAR1 and the active LPAR is switched to a standby one, the error-detected LPAR0 is restarted as a standby one. Consequently, the PCI device provided with a single port can be switched from the error-detected active LPAR to the normal standby one.

The PCI device hot-plugging of each conventional physical computer is started by an SCI (System control Interrupt) generated when the PCI device is connected/disconnected to cause a GPE (General Purpose Event) in the subject hardware, then sent to the subject OS. Receiving the SCI, the OS reads the content in the GPE register and recognizes the hot-plugged PCI device, then starts a hot-plug processing as described in the ACPI rule.

On the other hand, the present invention realizes logical hot-plugging for each PCI device by emulating both SCI source and GPE register with use of the control program 107.

In other words, while an active virtual machine LPAR0 and a standby virtual machine LPAR1 are included in a virtual machine system configured by a plurality of virtual machines LPAR operated under the control of the control program 107, if the standby virtual machine LPAR1 detects error occurrence in the active virtual machine LPAR0 and reports the error to the control program 107, the control program 107 issues an SCI to the standby virtual machine LPAR1 virtually. The control program 107 then returns the data that denotes occurrence of a hot-plug event to the OS upon its request for reference to the GPE register. At this time, the control program 107 changes allocation of PCI devices so as to enable accesses to the virtual machine LPAR1 connected to a PCI device.

Because the ACPI processing routine of the OS of the virtual machine LPSAR1 that receives an SCI executes a hot-plugging processing such way, the PCI device comes to be hot-plugged logically. As a result, a new PCI device comes to be added to the virtual machine LPAR1.

Furthermore, because the ACPI processing routine of the OS of the virtual machine LPAR0 that receives an SCI executes a hot-remove processing, the PCI comes to be hot-removed logically.

Such logical (virtual) hot plug and hot remove processings thus make it possible to disconnect the PCI device provided with a single port from the virtual machine LPAR0, then connect it to the LPAR1 so that the PCI device is shared between active and standby virtual machines LPAR0 and LPAR1. And, because the PCI device is always connected to the active virtual machine, the standby machine cannot access the PCI device. Consequently, when an error occurs in the standby machine, the PCI device can be prevented from accesses from the standby machine, thereby the reliability of the computer system is improved more.

In the above first embodiment, while only a disk unit is connected to the PCI card, any of other units such as a network card may be connected to the PCI card.

Furthermore, if the active virtual machine is switched to a standby one, the allocation rate of the active machine CPU may be set higher. For example, 90% may be set for the active machine CPU as its allocation rate (allocation time) while 10% is set for the standby machine CPU as its allocation rate to prevent the performance from degradation that might occur due to the multiplexed system. The control program 107 may be used to change such a CPU allocation rate.

Figure 12:
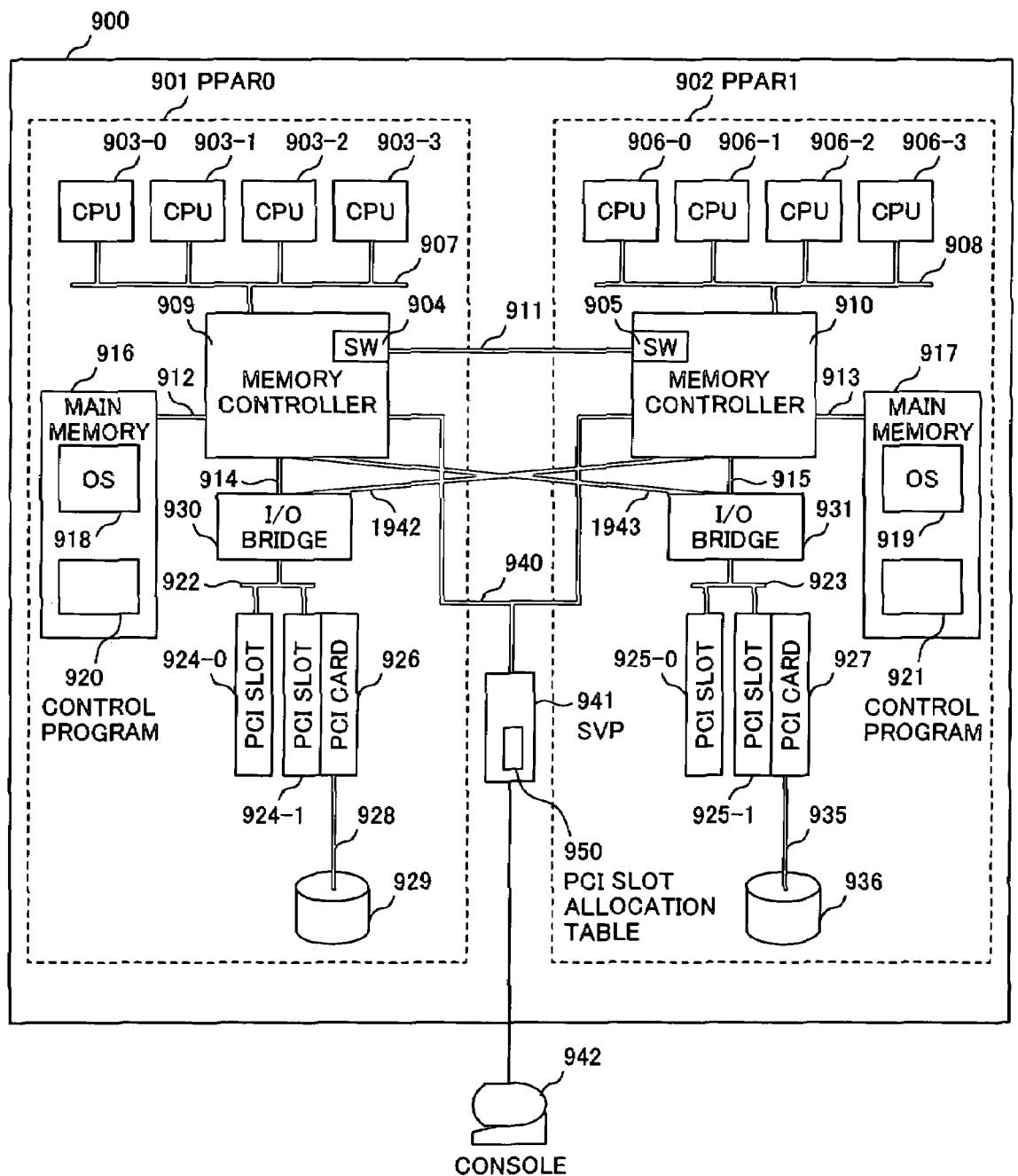
FIG. 12 is a block diagram of a physical partitioned computer in the second embodiment of the present invention.

FIG. 12 shows a block diagram of a computer system in the second embodiment of the present invention.

Unlike the virtual machine in the first embodiment, the computer hardware in this second embodiment is partitioned into a plurality of physical partitioned computers (LPARs).

A computer system 900 in this second embodiment is configured by CPUs 903-0 to 903-3 and 906-0 to 906-3, CPU buses 907 and 908, memory controllers 909 and 910, switches 904 and 905, an inter-memory controller network 911, memory buses 912 and 913, main memories 916 and 917, I/O buses 914 and 915, I/O bridges 930 and 931, PCI buses 922 and 923, PCI slots 924-0 and 924-1, 925-0 and 925-1, PCI cards 926 and 927, disk units 929 and 936, an SVC (Service Processor) 941, a control bus 940, and a console 942.

The computer system of the present invention is not limited in the number of units to be employed for each of the CPU, the I/O bridge, the PCI bus, the PCI slot, and the disk unit, however.

The computer system 900 may be partitioned into a physical partitioned computer 901 (hereinafter, to be described as LPAR0) and a physical partitioned computer 902 (hereinafter, to be described as LPAR1). The system manager makes this partitioning from the console 942 and the SVP 941 changes over the switch between 904 and 905 provided in the memory controllers 909 and 910 to invalidate the inter-memory controller network.

The system manager can also set data in the PCI slot allocation table 950 provided in the SVP 941 from the console 942. The SVP 941 updates the control programs 920 and 921 stored in the main memories 916 and 917 with the contents set in the PCI slot allocation table 950 through the control bus 940, the memory controllers 909 and 910, and the memory buses 912 and 913. The OS 918/919 allocates the PCI slot specified by the control program 920/921.

The OS 918/919 can recognize only either the PCI device 926 or 927 connected to one of the PCI slots 924-0, 924-1, 925-0, and 925-1, specified by the control program 920/921 stored in the main memory 916/917. This is why an internal bus 1943 is provided between the memory controller 909 and the I/O bridge 931 and an internal bus 1942 is provided between the memory controller 910 and the I/O bridge 930. The control program 920/921 is a firmware item generally provided with the same functions as those of the BIOS (Basic Input Output System).

In this second embodiment, a cluster is configured by LPAR0 and LPAR1 shown in FIG. 2. For example, PPAR0 is allocated as an active machine while PPAR1 is allocated as a standby machine. Hereunder, a description will be made only for the difference from the first embodiment with respect to a fail-over operation when a cluster is configured by a plurality of PPARs.

Every LPAR in FIGS. 3 and 4 in the above first embodiment will be replaced with PPAR in this second embodiment and the PCI slot allocation table shown in FIG. 2 is equivalent to the PCI slot allocation table 950 shown in FIG. 12.

Similarly, the commands shown in FIG. 3 are sent to the SVP 941 from the control program stored in the main memory through the controller bus 940. The SVP 941 deactivates\activates each PPAR. In other words, the SVP 941 controls starting up/shutting down each PPAR targeted by a command.

In the hot-add processing shown in FIG. 5, points different from those in the first embodiment will be enumerated below.

In all the steps shown in FIG. 5, every LPAR is replaced with a PPAR.

Similarly, in step 503 shown in FIG. 5, setting of the gate keeper is omitted and the control program 107 in the OS sends a request to the SVP 941 so as to update the PCI slot allocation table 950 through the control bus 940. The SVP 941 then updates the table 950 and changes the PCI slot allocation to PPARn.

Hereinafter, the differences of the hot remove processings shown in FIG. 6 from those in the first embodiment will be described one by one.

In all the steps, every LPAR is replaced with a PPAR.

In step 601, the control program 107 sends a PCI slot allocation change request to the SVP 941 through the control bus 940 so as to inhibit accesses from the OSn to the target PCI slot. The SVP 941 then sets "0" in the enable flag of the PCI slot s in the PCI slot allocation table 950.

The fail-over processings shown in FIG. 9 differ from those in the first embodiment. In all the steps, every LPAR is replaced with a PPAR.

The above changes in the second embodiment thus make it possible to update the PCI slot allocation table 950 of the SVP 941, thereby hot-removing/hot-adding the single port PCI device (card) 926/927 shared between PPAR0 and PPAR1 virtually so that the connection of the PCI device is switched between PPARs logically in a fail-over processing.

In FIG. 12, only the disk unit 929 is used as a data disk. And, if the active PPAR is switched from PPAR0 to PPAR1, the PCI slot allocation table 950 is updated with respect to the PCI card 926, so that the active PPAR1 is permitted to access the disk unit 929 through the memory controller 905 and the internal bus 942.

FIGS. 13 through 17 show the third embodiment of the present invention.

Figure 13:
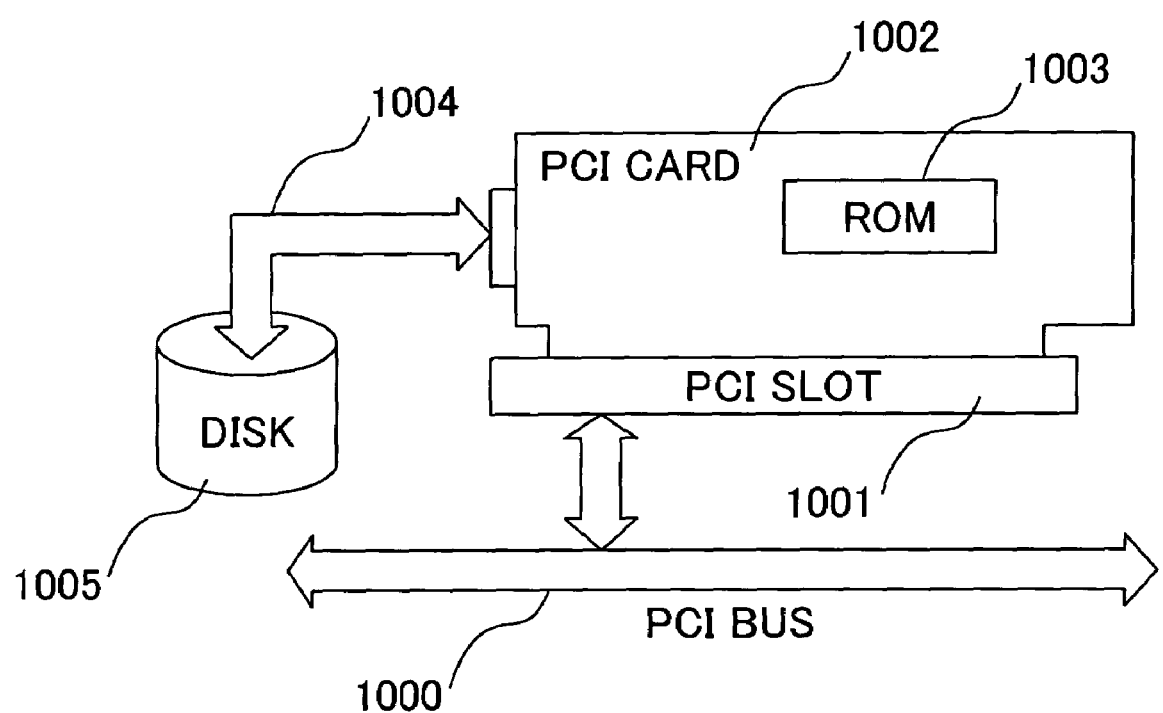
FIG. 13 is a block diagram of a PCI card in the third embodiment of the present invention.

In the third embodiment, as shown in FIG. 13, a control program is stored in a ROM 1003 provided in a PCI card 1002. The control program issues an interruption signal for starting a logical hot-plug processing.

In FIG. 13, a PCI bus 1000 is provided with a PCI slot 1001 and a PCI card 1002 is connected to this PCI slot 1001. The PCI card 1002 is connected to a disk unit 1005 through a signal line 1004. The PCI card 1002 is provided with a ROM 1003 for storing the control program.

This third embodiment is a variation of the first embodiment. The PCI card 1002 shown in FIG. 13 may be considered to be equivalent to the PCI card 111 used for the virtual machine system shown in FIG. 2.

In this third embodiment, the hot-add processing differs from that shown in FIG. 5 in the first embodiment; the control program stored in the ROM 1003 issues an SCI, although the control program 107 stored in the main memory issues the SCI in step 504 in the first embodiment. Others are all the same as those in the first embodiment shown in FIG. 5.

Figure 14:
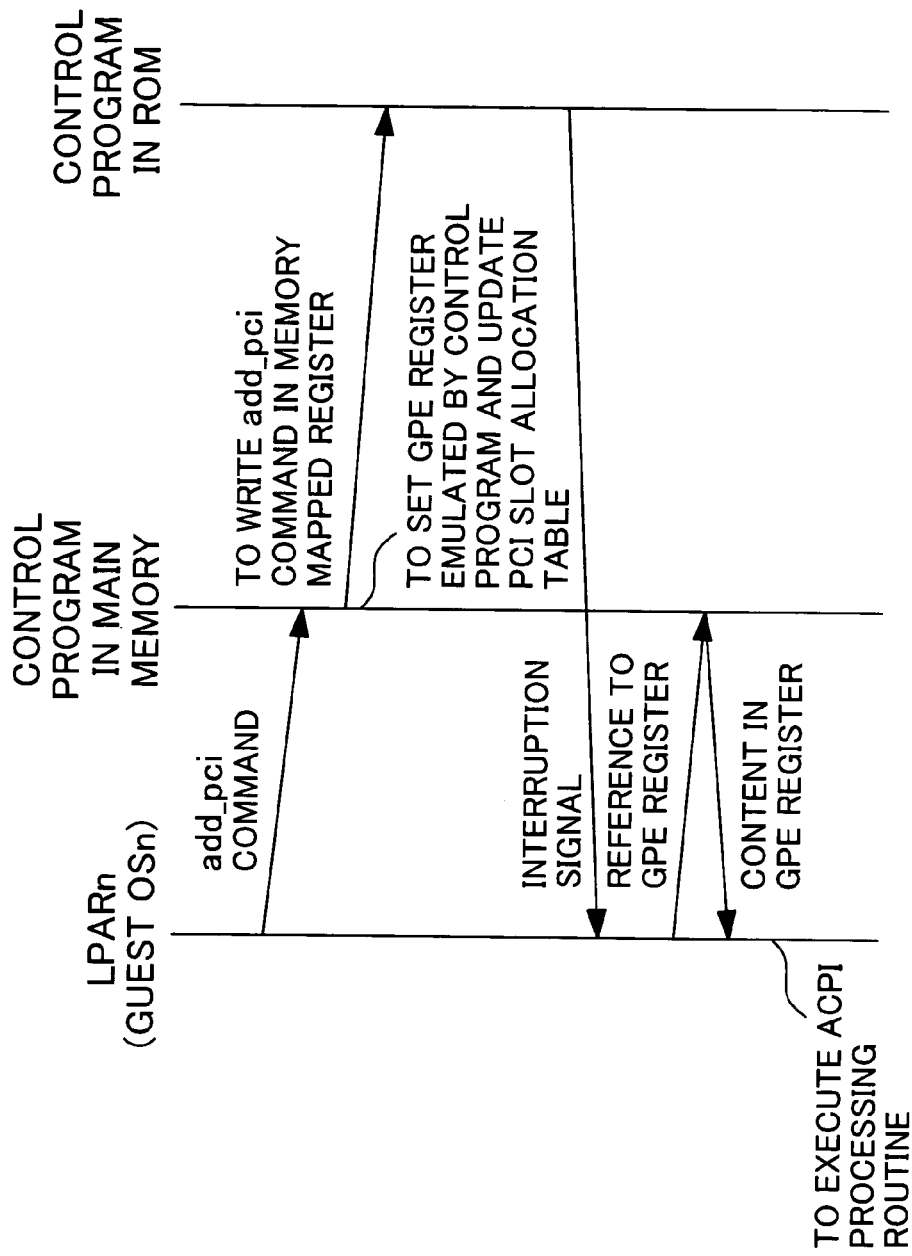
FIG. 14 is a time chart of hot-add processings performed in a virtual machine.

Concretely, as shown in a time chart in FIG. 14, the command control routine 124 decodes the "add_pci" command received by the control program 107 stored in the main memory shown in FIG. 2 from the LPAR (the guest OS in FIG. 2) and requests the PCI card 111 inserted in the hardware 109 to send an SCI to the guest OS. When the PCI card 1002 receives the SCI request, the control program stored in the ROM 1003 shown in FIG. 13 issues an SCI to the LPAR from which the "add_pci" command is issued. Consequently, the LPAR refers to the GPE register and executes the ACPI processing routine to mount the PCI card 1002.

The hot-remove processing shown in FIG. 6 also differs from that in the first embodiment; concretely, the control program stored in the ROM 1003 shown in FIG. 13 issues an SCI, although the SCI is issued from the control program 107 in step 603 in the first embodiment. Others are all the same as those in the first embodiment.

Figure 15:
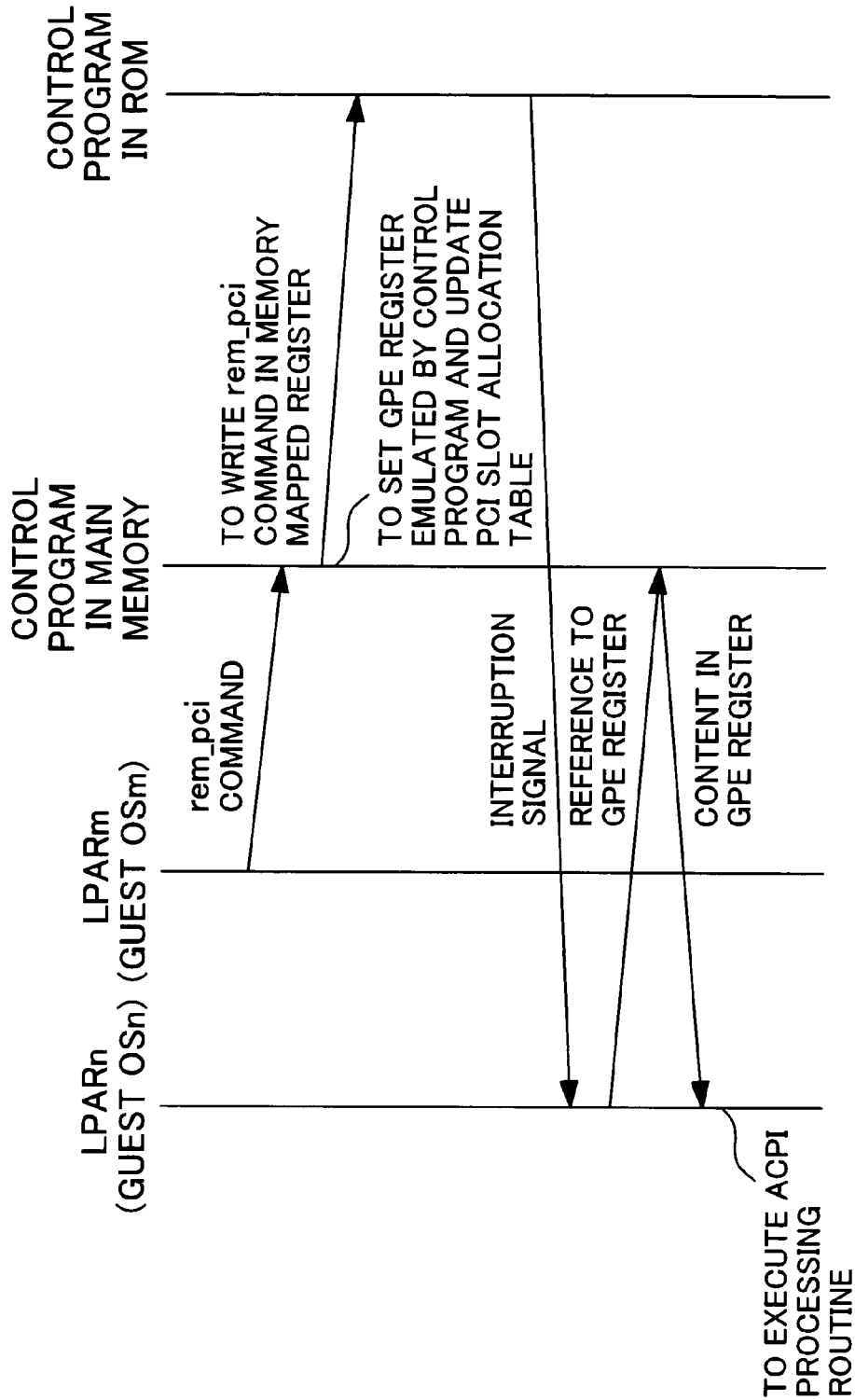
FIG. 15 is a time chart of hot-remove processings performed in a virtual machine.

Concretely, as shown in a time chart in FIG. 15, the command control routine 124 decodes the "rem_pci" command received by the control program 107 stored in the main memory shown in FIG. 2 from the LPARm and requests the PCI card 1002 inserted in the hardware 109 to send an SCI to the guest OS. When the PCI card 1002 receives the SCI request, the control program stored in the ROM 1003 shown in FIG. 13 issues an SCI to the LPARn specified with "rem_pci" command. After that, the LPARn refers to the GPE register and executes the ACPI processing routine.

As described above, because the control program that issues an interruption signal for starting a logical hot-plug processing is stored in the ROM 1003 of the PCI card 1002, both hot-add and hot-remove processings can be realized virtually for the PCI card 1002. And, consequently, the connection of the single port PCI device is switched virtually among a plurality of virtual machines, so that the system reliability is improved.

Figure 16:
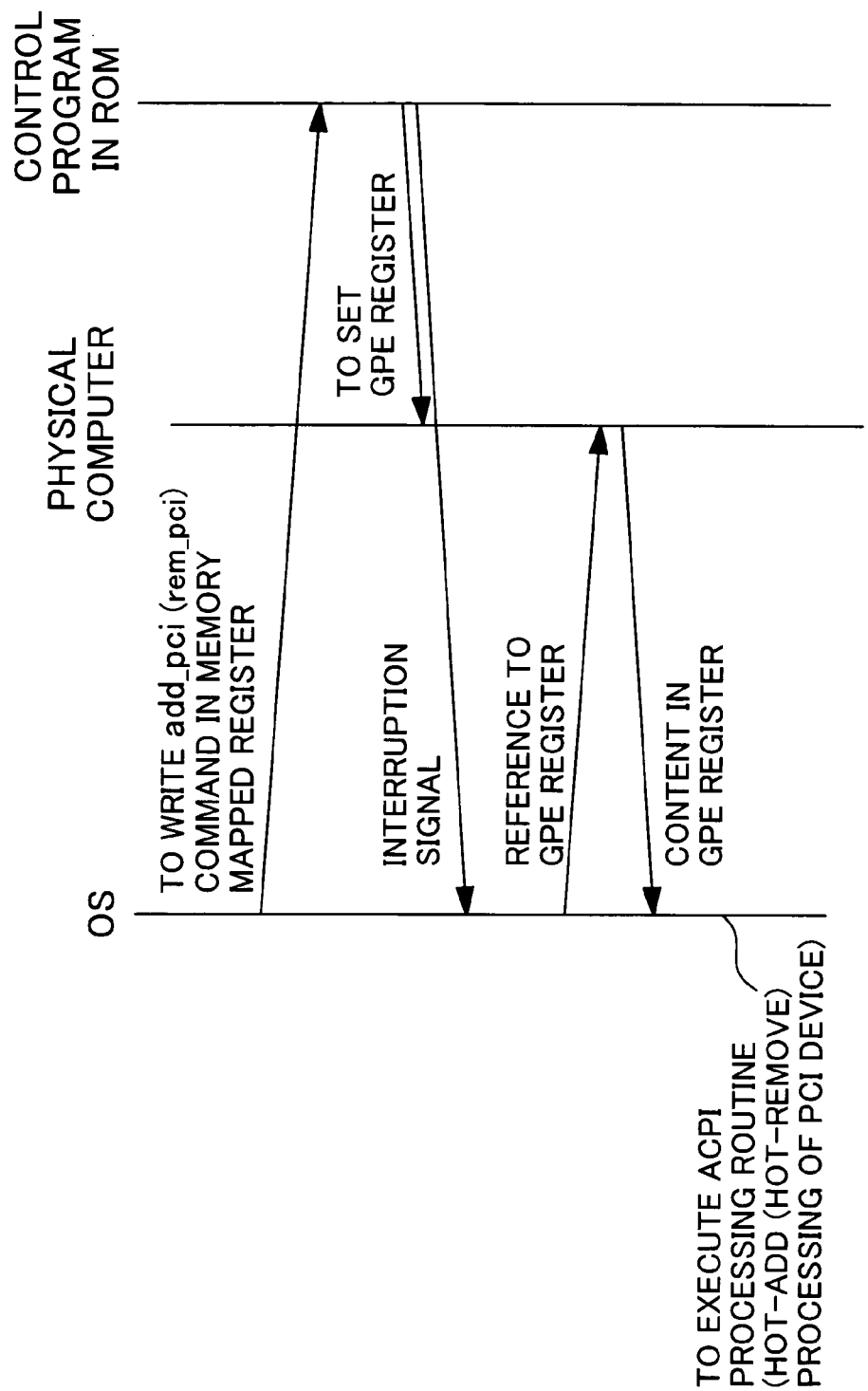
FIG. 16 is a time chart of hot-add (or hot-remove) processings performed in a physical partitioned computer.

FIG. 16 shows a time chart for a hot-add or hot-remove processing performed by a physical computer configured as shown in FIG. 13 in the second embodiment. In FIG. 16, the PCI cards 926 and 928 and the disk units 929 and 936 shown in FIG. 12 are replaced with those shown in FIG. 13.

The hot-add processing is similar to that shown in FIG. 14 except that the SCI is sent to the physical computers (PPAR0, 1, and OS in FIG. 12).

Although the control program 107 stored in the main memory issues the SCI in step 504 in the first embodiment just like in the hot-add processing shown in FIG. 5, the control program stored in the ROM 1003 issues the SCI to the OS of the target physical computer in this third embodiment. It is only a difference between the first and third embodiments. Others are all the same between the first and third embodiments.

As shown in the time chart in FIG. 16, the command control routine decodes the "add_pci" command received by the control program 920/921 stored in the main memory shown in FIG. 12 from the OS and requests the PCI card 1002 to send an SCI signal to the OS. When the PCI card 1002 receives this SCI request, the control program 922/921 stored in the ROM 1003 shown in FIG. 13 issues an SCI to the OS from which the "add_pci" command has been issued. Consequently, the OS refers to the GPE register, then executes the ACPI processing routine to mount the PCI card 1002.

Similarly, the hot-remove processing shown in FIG. 6 differs from that in the first embodiment; concretely, the control program stored in the ROM 1003 shown in FIG. 13 issues an SCI in this third embodiment, although the SCI is issued from the control program 107 stored in step 603 in the first embodiment.

In other words, as shown in a time chart in FIG. 16, the command control routine decodes the "rem_pci" command received by the control program 920/921 stored in the main memory shown in FIG. 12 from the OS and requests the PCI card 1002 to send an SCI signal to the OS. When the PCI card 1002 receives the SCI request, the control program 920/921 stored in the ROM 1003 shown in FIG. 13 issues an SCI to the OS specified with the "rem_pci" command. After that, the OS refers to the GPE register and executes the ACPI processing routine.

As described above, because the control program that issues an interruption signal for starting a logical hot-plug processing is stored in the ROM 1003 of the PCI card 1002, both hot-add and hot-remove processings can be realized virtually for the PCI card 1002 just like the virtual machines shown in FIGS. 14 and 15.

Figure 17:
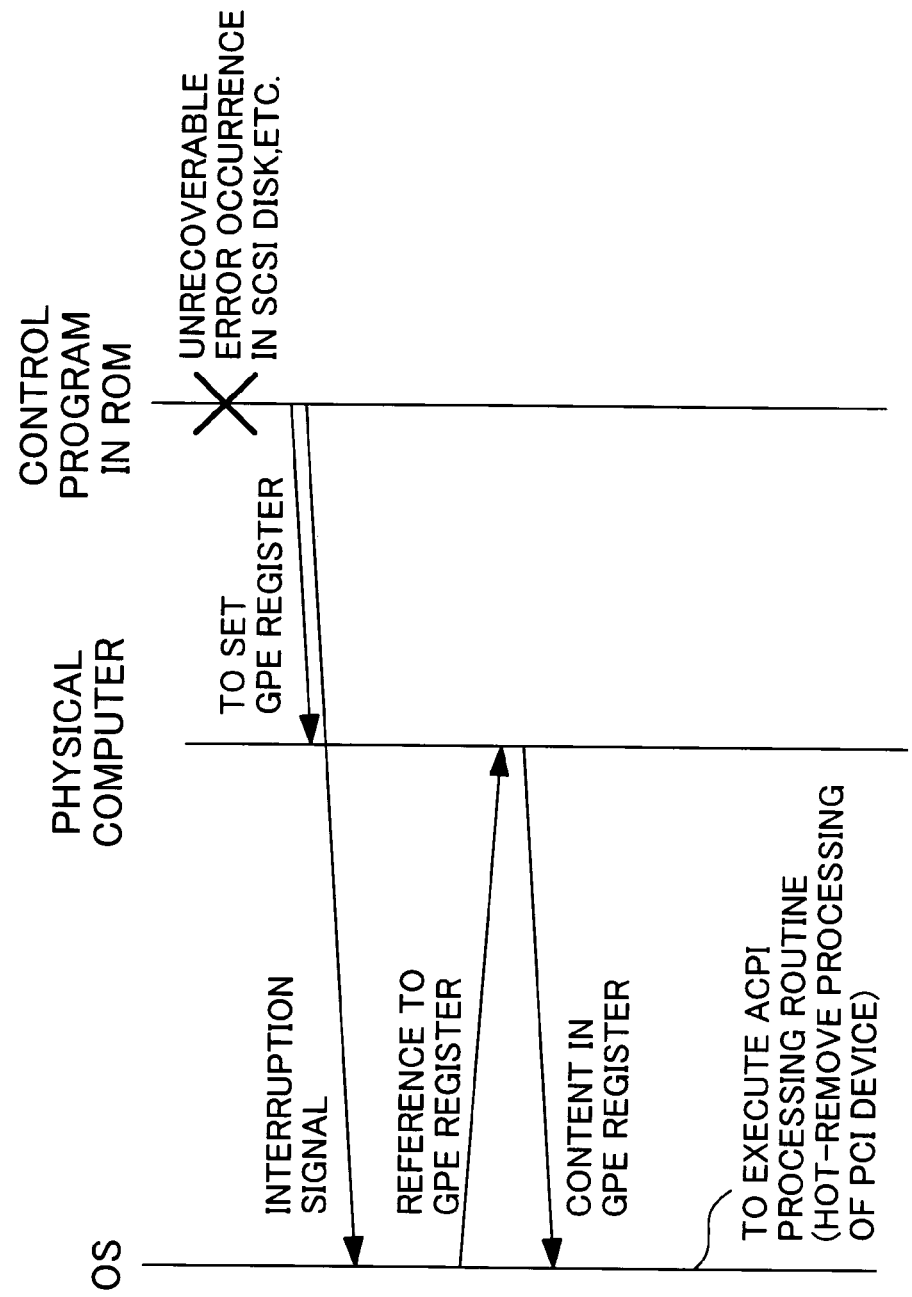
FIG. 17 is a time chart of hot-remove processings performed in response to error occurrence in a PCI device.

FIG. 17 shows a time chart for the processings performed when an error occurs in the disk unit 1005 shown in FIG. 13. The computer shown in FIG. 17 is the same as that shown in FIG. 16.

If the PCI card 1002 provided with such an interface as a SCSI one detects an unrecoverable error in the disk unit 1005 with use of the control program stored in the ROM 103, the PCI card 1002 sets a value in the GPE register of the physical computer and issues an SCI to the OS.

The OS, when receiving this interruption signal, refers to the GPE register, then executes the ACPI processing routine to hot-remove the error-detected PCI card 1002.

Therefore, a value can be set in the GPE register to issue an instruction to the OS so as to hot-remove the PCI device from the PCI card 1002 regardless of whether or not an error occurs in the PCI device.

What is claimed is:

1. A computer system, comprising:
   a plurality of virtual machines formed on a control program of a computer;
   an I/O device coupled with a PCI bus of said computer and shared among said plurality of virtual machines;
   a single port disposed in said I/O device and connected to said PCI bus;

PCI connection allocating means for setting a state of logical connection between selected at most one of said plurality of virtual machines and said port at a time; and I/O device switching means for updating said state of logical connection set by said PCI connection allocating means according to a control signal received from said selected virtual machine, wherein said selected virtual machine changes said state of logical connection of said selected virtual machine to said I/O device according to a setting by said PCI connection allocating means, wherein in response to detection of occurrence of an error in said selected virtual machine, said selected virtual machine is deactivated, connection to said I/O device is switched to a standby virtual machine, said standby virtual machine is set as an active virtual machine, and said deactivated virtual machine is repaired and set as a standby virtual machine, wherein said plurality of virtual machine comprise first and second virtual machines, wherein said second virtual machine sends to said control program a command to switch a state of logical connection of said first virtual machine to said I/O device, said second virtual machine sends to said control program a command to deactivate or activate said first virtual machine upon detecting occurrence of an error in said first virtual machine, and said control program deactivates or activates said first virtual machine with respect to said control program in response to said command being received, wherein said control program includes a PCI connection allocating table, said PCI connection allocating table is changed so that connection with said I/O device is switched to said first virtual machine according to a control signal received, in response to said PCI connection allocating table being changed, said control program generates an interruption signal, and in response to said interruption signal being received by said first virtual machine, said first virtual machine changes connection to said I/O device, and wherein said first virtual machine is rebooted to reconstruct said first virtual machine as a standby machine and a CPU allocation rate of said first virtual machine is set to be low.

2. The computer system according to claim 1, wherein the I/O device is a disk unit.

3. The computer system according to claim 1, wherein the system comprises a plurality of I/O devices.

4. An I/O device coupled with a PCI bus of a computer, comprising:

a single port connected to said PCI bus;

signal generating means for generating an interruption signal used to change a state of logical connection of said port according to a control signal received from said computer;

an operating system performing hot-add/remove processing of said I/O device in response to said interruption signal running on said computer; and an allocating means for setting said state of logical connection of said port, wherein said computer, when receiving said interruption signal, changes a state of logical connection of said computer to said port, wherein in response to detection of occurrence of an error in a virtual machine, said virtual machine is deactivated, connection to said I/O device is switched to a standby virtual machine, said standby virtual machine is set as an active virtual machine, and said deactivated virtual machine is repaired and set as a standby virtual machine, wherein said signal generating means generates said interruption signal and updates said allocating means for setting said state of logical connection of said port, wherein a second virtual machine sends to said control program a command to switch a state of logical connection of a first virtual machine to said I/O device, said second virtual machine sends to said control program a command to deactivate or activate said first virtual machine upon detection of occurrence of an error in said first virtual machine, said control program deactivates or activates said first virtual machine with respect to said control program in response to said command being received, wherein said control program includes a PCI connection allocating table, said PCI connection allocating table is changed so that connection with said I/O device is switched to said first virtual machine according to a control signal received, in response to said PCI connection allocating table being changed, said control program generates an interruption signal, and in response to said interruption signal being received by said first virtual machine, said first virtual machine changes connection to said I/O device, and wherein said first virtual machine is rebooted to reconstruct said first virtual machine as a standby machine and a CPU allocation rate of said first virtual machine is set to be low.

5. The I/O device according to claim 4, wherein the I/O device is a disk unit.

6. A method for sharing an I/O device coupled with a PCI bus of a computer among a plurality of virtual machines formed on a control program of said computer, comprising the steps of:

selecting at most one virtual machine among said plurality of virtual machines at a time;

enabling said I/O device to set a state of logical connection between said selected virtual machine and a single port of said I/O device connected to said PCI bus through said single port;

changing said state of logical connection between said port and said selected virtual machine according to a control signal received from said selected virtual machine;

in response to detection of occurrence of an error in said selected virtual machine, deactivating said selected virtual machine; then, switching connection to said I/O device to a standby virtual machine;

setting said standby virtual machine as an active virtual machine; and repairing said deactivated virtual machine, and setting the repaired deactivated virtual machine as a standby virtual machine, wherein said computer includes first and second virtual machines formed therein, wherein said step of changing said state of logical connection includes the steps of, when detecting error occurrence in any of said plurality of virtual machines, updating an allocation table for setting a state of logical connection between said port and each virtual machine, letting said error-detected virtual machine stand by and activating another virtual machine, wherein said second virtual machine sends to said control program a command to switch a state of logical connection of said first virtual machine to said I/O device, said second virtual machine sends to said control program a command to deactivate or activate said first virtual machine in response to detection of occurrence of an error in said first virtual machine, said control program deactivates or activates said first virtual machine with respect to said control program in response to said command being received, wherein said control program includes a PCI connection allocating table, said PCI connection allocating table is changed so that connection with said I/O device is switched to said first virtual machine according to a control signal received, in response to said PCI connection allocating table being changed, said control program generates an interruption signal, and in response to said interruption signal being received by said first virtual machine, said first virtual machine changes connection to said I/O device, and wherein said first virtual machine is rebooted to reconstruct said first virtual machine as a standby machine and a CPU allocation rate of said first virtual machine is set to be low.

7. The method according to claim 6, wherein the I/O device is a disk unit.

8. The method according to claim 7, wherein the PCI bus is coupled with a plurality of I/O devices.

* * * * *